US011887454B2

(12) United States Patent
Chan et al.

(10) Patent No.: US 11,887,454 B2
(45) Date of Patent: Jan. 30, 2024

(54) SYSTEM AND METHOD FOR MONITORING ELEVATOR OPERATING ENVIRONMENT

(71) Applicant: Otis Elevator Company, Farmington, CT (US)

(72) Inventors: Kin Chun Chan, Kowloon (HK); Siu Pang Ng, Kowloon (HK); Tat Fung Chu, Kowloon (HK)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/868,955

(22) Filed: Jul. 20, 2022

(65) Prior Publication Data

US 2023/0027294 A1 Jan. 26, 2023

(30) Foreign Application Priority Data

Jul. 21, 2021 (CN) ......................... 202110825470.1
Aug. 30, 2021 (CN) ......................... 202111003838.2

(51) Int. Cl.

*G08B 21/02* (2006.01)
*G08B 5/36* (2006.01)
*G08B 21/18* (2006.01)

(52) U.S. Cl.

CPC ............... *G08B 21/02* (2013.01); *G08B 5/36* (2013.01); *G08B 21/182* (2013.01)

(58) Field of Classification Search

CPC ......... G08B 21/02; G08B 5/36; G08B 21/182
See application file for complete search history.

(56) References Cited

U.S. PATENT DOCUMENTS

2020/0380853 A1 12/2020 Sun
2021/0087017 A1 3/2021 Pahlke

FOREIGN PATENT DOCUMENTS

CN 206232255 * 12/2016
CN 111573462 * 5/2020 ........... B66B 5/0031
CN 111899492 * 6/2020 ............. G08B 23/00
CN 112357712 * 11/2020 ........... B66B 5/0087
WO 2018039958 A1 3/2018

OTHER PUBLICATIONS

European Search Report for application EP 22186353, dated Nov. 16, 2022, 66 pages.

* cited by examiner

*Primary Examiner* — Hongmin Fan
(74) *Attorney, Agent, or Firm* — CANTOR COLBURN LLP

(57) ABSTRACT

A system and method for monitoring an elevator operating environment. The system for monitoring the elevator operating environment includes at least one local monitoring device, a cloud computing platform, and at least one alarm module associated with the local monitoring device, wherein, each of the local monitoring devices is arranged in an operating area and is configured to: determine heat index based on temperature data and humidity data of the operating area, and output a first warning message locally; and transmit the temperature data and humidity data to the cloud computing platform regularly or irregularly, the cloud computing platform is configured to send the temperature data and humidity data to the alarm module regularly or irregularly, and the alarm module is configured to generate a third warning message based on the temperature data and humidity data and present the third warning message.

18 Claims, 7 Drawing Sheets

| HOW TO CALCULATE HEAT INDEX 如何计算热力指数 | | | | | | | | | | |
|---|---|---|---|---|---|---|---|---|---|---|
| | | Relative Humidity 相对湿度 | | | | | | | | |
| | | 10% | 20% | 30% | 40% | 50% | 60% | 70% | 80% | 90% |
| Air Temperature(°C) 气温(°C) | 50 | 44 | 52 | 54 | >54 | >54 | >54 | >54 | >54 | >54 |
| | 49 | 43 | 51 | >54 | >54 | >54 | >54 | >54 | >54 | >54 |
| | 48 | 43 | 50 | 53 | 54 | >54 | >54 | >54 | >54 | >54 |
| | 47 | 42 | 48 | 52 | 54 | >54 | >54 | >54 | >54 | >54 |
| | 46 | 41 | 47 | 50 | 54 | >54 | >54 | >54 | >54 | >54 |
| | 45 | 41 | 46 | 50 | 54 | >54 | >54 | >54 | >54 | >54 |
| | 44 | 40 | 45 | 49 | 54 | >54 | >54 | >54 | >54 | >54 |
| | 43 | 39 | 44 | 48 | 54 | >54 | >54 | >54 | >54 | >54 |
| | 42 | 38 | 43 | 46 | 54 | >54 | >54 | >54 | >54 | >54 |
| | 41 | 38 | 41 | 45 | 52 | 54 | >54 | >54 | >54 | >54 |
| | 40 | 37 | 40 | 43 | 49 | 54 | >54 | >54 | >54 | >54 |
| | 39 | 36 | 38 | 42 | 47 | 52 | 54 | >54 | >54 | >54 |
| | 38 | 35 | 37 | 41 | 43 | 49 | 54 | >54 | >54 | >54 |
| | 37 | 34 | 36 | 38 | 41 | 43 | 54 | 54 | >54 | >54 |
| | 36 | 33 | 35 | 37 | 40 | 43 | 49 | 53 | 54 | >54 |
| | 35 | 32 | 34 | 36 | 39 | 43 | 48 | 52 | 54 | >54 |
| | 34 | 32 | 34 | 35 | 38 | 41 | 44 | 50 | 53 | 54 |
| | 33 | 31 | 32 | 33 | 36 | 38 | 41 | 46 | 50 | 53 |
| | 32 | 29 | 31 | 32 | 33 | 36 | 38 | 41 | 46 | 50 |
| | 31 | 28 | 30 | 31 | 32 | 34 | 35 | 38 | 41 | 46 |
| | 30 | 27 | 28 | 29 | 31 | 32 | 33 | 36 | 38 | 43 |
| | 29 | 26 | 27 | 28 | 29 | 30 | 32 | 33 | 36 | 37 |
| | 28 | 25 | 26 | 27 | 27 | 29 | 30 | 32 | 33 | 36 |
| | 27 | 24 | 25 | 26 | 26 | 27 | 28 | 29 | 30 | 32 |
| | 26 | 22 | 24 | 25 | 26 | 26 | 27 | 27 | 26 | 29 |
| Example:The Temperature stands at 34°C and the RH is now 62%<br>例：气温摄氏34度，相对湿度为62% | | | | | | | | | | |
| The heat index is 44 in the Danger area. 热力指数为44，属于危险区 | | | | | | | | | | |

| | 减低热压力对人体影响的工作措施 | | | |
|---|---|---|---|---|
| Heat Level 级别 | Heat Index 热指数 | 工作：休息时间的比例 | 饮水量（1杯=1/4升） | Controls 有关措施 |
| 1 | 27-31 | 50:10 | 1 Cup every 20 minutes 每20分钟饮水一杯 | |
| 2 | 32-38 | 40:10 | 1 Cup every 20 minutes 每20分钟饮水一杯 | No work alon 不宜单独工作 |
| 3 | 39 49 | 30:10 | 1 Cup every 15 minutes 每15分钟饮水一杯 | |
| 4 | 50-43 | 20:10 | 1 Cup every 10 minutes 每10分钟饮水一杯 | Elevated Work Stopped 停止高空工作 |
| 5 | ≥ 54 | – | – | All Work Stopped 完全停止工作 |

Figure 1

SYSTEM AND METHOD FOR MONITORING ELEVATOR OPERATING ENVIRONMENT

FOREIGN PRIORITY

This application claims priority to Chinese Patent Application Nos. 202110825470.1, filed Jul. 21, 2021 and 202111003838.2, filed Aug. 30, 2021, and all the benefits accruing therefrom under 35 U.S.C. § 119, the contents of which in its entirety are herein incorporated by reference.

TECHNICAL FIELD OF INVENTION

The application relates to elevator operating safety technology, and in particular to a system and method for monitoring an elevator operating environment.

BACKGROUND OF THE INVENTION

In recent years, with the trend of global warming, fatal accidents related to heat exposure (such as heat stroke) have shown a steady rise. Although the labor department has issued operational guidelines such as site guidelines and heat stress assessment checklists as measures to prevent heat exposure accidents, it is not enough to fundamentally reduce the accident rate, because the content of these operational guidelines is too general and does not have quantitative indicators, and its execution depends on the subjective experience of the operator.

For elevator operations, because the operating space is usually closed and narrow, and the ventilation is bad, there is a higher risk of accidents. In addition, the wide distribution of elevator operating sites and complexity and dynamical changes in site conditions have brought further challenges to accident prevention.

From the above, there is a need to provide a method and device that can reliably monitor the elevator operating environment.

SUMMARY OF THE INVENTION

The embodiments of the application provide a system and method for monitoring the elevator operating environment, which can reliably monitor the elevator operating environment and report information about changes in the operating environment to related parties, thereby improving the ability to prevent accidents.

According to one aspect of the application, there is provided a system for monitoring the elevator operating environment, comprising at least one local monitoring device, a cloud computing platform, and at least one alarm module associated with the local monitoring device, wherein, each of the local monitoring devices is arranged in an associated elevator installation or maintenance operating area and is configured to: determine heat index based on temperature data and humidity data of the associated elevator installation or maintenance operating area, and output a first warning message corresponding to the determined heat index locally; and transmit the temperature data and humidity data to the cloud computing platform regularly or irregularly, wherein, the cloud computing platform is configured to send the temperature data and humidity data to the alarm module regularly or irregularly, and the alarm module is configured to generate a corresponding third warning message based on the temperature data and humidity data and present the generated third warning message; or the cloud computing platform is configured to generate a corresponding second warning message based on the temperature data and humidity data and send the second warning message to the alarm module, and the alarm module is configured to generate a corresponding third warning message based on the temperature data and humidity data and present the generated third warning message.

Optionally, in the above system, each of the local monitoring devices comprises: a sensor configured to obtain the temperature data and humidity data of the associated elevator installation or maintenance operating area; a communication unit configured to communicate with the cloud computing platform; an output unit; and a control unit coupled with the sensor, the communication unit and the output unit, the control unit is configured to perform the following operations: determine the heat index based on the temperature data and humidity data; instruct the output unit to output a first warning message corresponding to the determined heat index; and instruct the communication unit to transmit the temperature data and humidity data to the cloud computing platform.

Optionally, in the above system, the local monitoring device further comprises a battery as a power supply source.

Optionally, in the above system, the communication unit communicates with the cloud computing platform via at least one of the following networks: narrowband Internet of Things, 3G/4G/5G communication network, WiFi network, and Bluetooth network.

Optionally, in the above system, the first warning message comprises a value range or level to which the heat index of the associated elevator installation or maintenance operating area belongs and the longest continuous operating time interval allowed under the corresponding value range.

Optionally, in the above system, the output unit comprises a plurality of light-emitting diodes whose light-emitting state is controlled by the control unit, and the light-emitting state of each light-emitting diode is used to indicate the value range or level to which the heat index of the associated elevator installation or maintenance operating area belongs.

Optionally, in the above system, the control unit controls the light-emitting diode to periodically emit light to indicate the value range or level to which the heat index of the associated elevator installation or maintenance operating area belongs.

Optionally, in the above system, the longest continuous operating time interval is printed in an area close to the light-emitting diode.

Optionally, in the above system, the second warning message and the third warning message comprise at least: the location of the associated elevator installation or maintenance operating area and the value range or level to which the heat index of the operating area belongs.

Optionally, in the above system, the alarm module is adapted to reside in a client terminal, and is configured to present the second warning message or the third warning message by means of a human-computer interaction interface of the client terminal.

Optionally, in the above system, the alarm module is arranged in the associated elevator installation or maintenance operating area or in an area away from the associated elevator installation or maintenance operating area.

According to another aspect of the application, there is provided a system for monitoring the elevator operating environment, comprising the following steps: A. Using a local monitoring device to determine heat index based on temperature data and humidity data of an associated elevator installation or maintenance operating area, and output a first warning message corresponding to the determined heat index locally, the method also comprises the following steps performed independently of step A: B1. using the local monitoring devices to transmit the temperature data and humidity data to the cloud computing platform regularly or irregularly; B2. using the cloud computing platform to generate a corresponding second warning message based on the temperature data and humidity data and send the second warning message to an alarm module, so that the alarm module presents the second warning message sent by the cloud computing platform, or send the temperature data and humidity data from the cloud computing platform to the alarm module, so that the alarm module generates a corresponding third warning message based on the temperature data and humidity data and presents the generated third warning message.

According to another aspect of the application, there is provided a computer-readable storage medium, the computer-readable storage medium stores instructions, and when the instructions are executed by a processor, the processor is caused to execute the above method.

BRIEF DESCRIPTION OF THE DRAWINGS

The above and/or other aspects and advantages of the application will become clearer and easier to understand through the following description of each aspect in conjunction with the accompanying drawings. The same or similar elements in the accompanying drawings are represented by the same reference numerals. The drawings comprise:

FIG. 1 is an exemplary example, which shows the relationship between heat index and the combination of air temperature-relative humidity as well as the corresponding preventive measures at different heat index levels.

DETAILED DESCRIPTION OF THE INVENTION

Hereinafter, the application will be described more fully with reference to the accompanying drawings in which exemplary embodiments of the application are illustrated. However, the application can be implemented in different forms, and should not be interpreted as being limited to the embodiments given herein. The above-mentioned embodiments are provided to make the disclosure herein comprehensive and complete, so as to convey the protection scope of the application to those skilled in the art more comprehensively.

In this specification, terms such as "comprising" and "including" mean that in addition to units and steps that are directly and clearly stated in the specification and claims, the technical solution of the application does not exclude the presence of other units and steps that are not directly and clearly stated in the specification and claims.

Unless otherwise specified, terms such as "first" and "second" do not indicate the order of the units in terms of time, space, size, etc., but are merely used to distinguish the units.

In this specification, "coupling" should be understood to comprise the case where electrical energy or electrical signals are directly transmitted between two units, or the case where electrical energy or electrical signals are indirectly transmitted through one or more third units.

In this specification, "heat index" should be understood as a parameter that can reflect the degree of impact of heat-related environmental state parameters on human health. Examples of the environmental state parameters comprise, but are not limited to, temperature and relative humidity.

In this embodiment, optionally, the heat index can be divided into multiple levels, and each level corresponds to a value range of the heat index; in addition, the value of the heat index can be determined based on the value combination of air temperature and relative humidity.

FIG. 1 is an exemplary example, which shows the relationship between heat index and the combination of air temperature-relative humidity and the corresponding preventive measures at different heat index levels.

Figure 2:
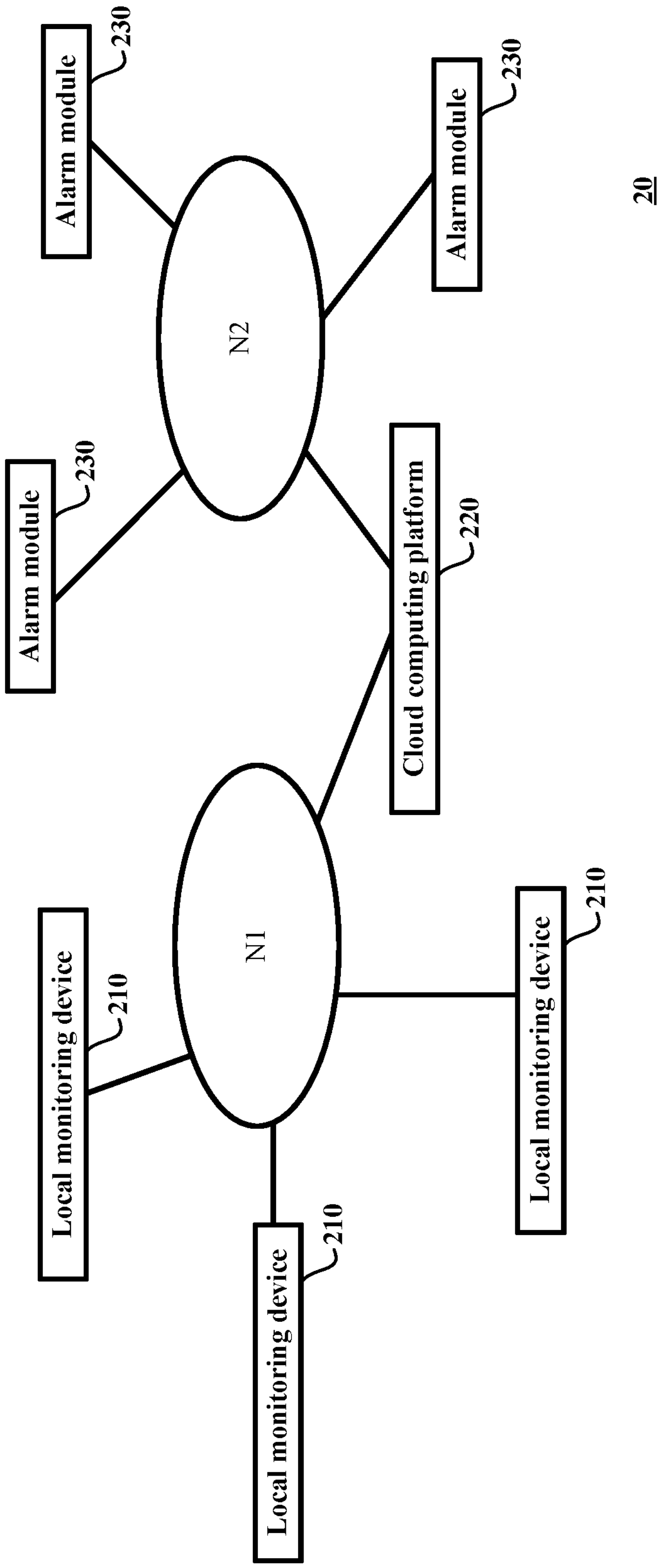
FIG. 2 is a schematic block diagram of a system for monitoring an elevator operating environment according to an embodiment of the application.

FIG. 2 is a schematic block diagram of a system for monitoring an elevator operating environment according to an embodiment of the application.

The system 20 shown in FIG. 2 comprises at least one local monitoring device 210, a cloud computing platform 220, and at least one alarm module 230. The local monitoring device 210 can communicate with the cloud computing platform 220 via the first network N1, and the alarm module 230 can communicate with the cloud computing platform 220 via the second network N2.

It should be pointed out that in this embodiment, the first network N1 and the second network N2 may be different networks or the same network. Exemplarily, the first and second networks may be selected from one of the following networks: narrowband Internet of Things, 3G/4G/5G communication network, WiFi network, and Bluetooth network, and so on.

Each local monitoring device 210 is arranged in an associated elevator installation or maintenance operating area, that is, is set in the operating area that needs to be monitored. In this embodiment, each local monitoring device 210 is configured to perform at least the following operations or provide at least the following functions:

A1) Obtaining the temperature data and humidity data (such as relative humidity data) of the elevator installation or maintenance operating area, using one or more sensors.

A2) Determining the heat index of the operating area based on the obtained temperature data and humidity data. Exemplarily, the relationship table shown in FIG. 1 can be used to obtain the heat index and the corresponding heat index level from the temperature data and the humidity data.

A3) Outputting the first warning message corresponding to the determined heat index locally. In this embodiment, optionally, the first warning message comprises a value range or level to which the heat index of the elevator installation or maintenance operating area belongs and the longest continuous operating time interval allowed under the corresponding level.

Functions A2 and A3 may be performed by a controller (e.g., a microprocessor based controller) in each local monitoring device 210 and executing a program to perform the operations described herein.

Figure 3:
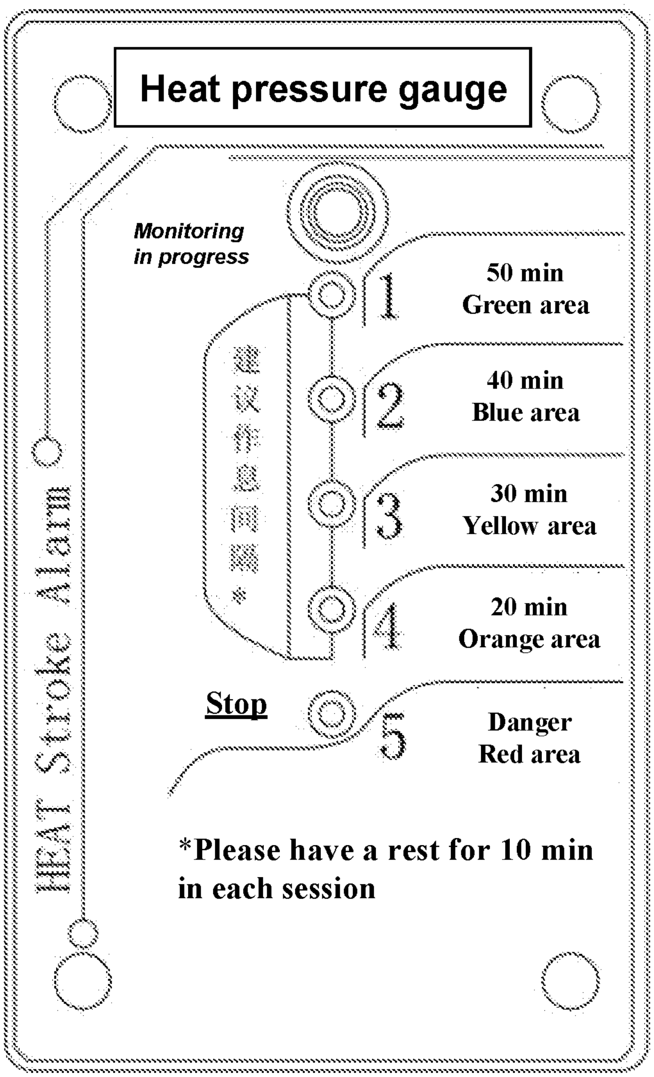
FIG. 3 is an exemplary example, which shows how the first warning message is presented.

FIG. 3 is an exemplary example, which shows how the first warning message is presented. Referring to FIG. 3, multiple LEDs can be provided on a panel of the local monitoring device 210, and the light-emitting state of each LED is used to indicate one of the heat index levels. For example, in the example of FIG. 3, five LEDs arranged from top to bottom correspond to five heat index levels. After the heat index level of the operating area is determined, the corresponding LED can be lit or flashed to remind the on-site users of the heat index level of the current environment. Optionally, the LED corresponding to the current heat index level will be lit or flashed periodically (for example, every 30 seconds) to save power consumption.

The longest continuous operating time interval in the first warning message can be printed in an area on the panel near the LED indicator. For example, as shown in FIG. 3, the longest continuous operating time interval under each heat index level is printed on the right side of five LEDs respectively.

A4) Transmitting the obtained temperature data and humidity data to the cloud computing platform regularly or irregularly. It should be pointed out that the above operation A4) can be performed independently of operations A2) and A3).

In this embodiment, optionally, the local monitoring device 210 is connected to the cloud computing platform 220 (e.g., distributed servers) via the narrowband Internet of Things. Compared with the 4G LTE network, the signal strength or penetration ability of the narrowband Internet of Things is stronger, so it has better connectivity. For elevator operations that often need to be carried out in a closed space or underground, it is beneficial to use the narrowband Internet of Things as the access network of the local monitoring device to connect to the cloud computing platform.

In this embodiment, the cloud computing platform 220 is configured to perform at least the following operations or provide at least the following functions:

B1) Receiving the temperature data and humidity data sent regularly or irregularly from the local monitoring device 210.

B2) Sending the received temperature data and humidity data to the alarm module regularly or irregularly.

B3) Generating a corresponding second warning message based on the received temperature data and humidity data and send the second warning message to the alarm module. In this embodiment, optionally, the second warning message comprises at least the location of the elevator installation or maintenance operating area and the heat index level of the operating area. In addition, optionally, the cloud computing platform 220 may be configured to send the generated second warning message regularly or irregularly. For example, the cloud computing platform 220 may determine whether to immediately send the generated second warning message based on the heat index level, where if the heat index level is higher (for example, 4 or 5), it is sent immediately, otherwise it is sent periodically.

When the cloud computing platform is used to generate the corresponding warning message, the calculation load of the alarm module can be reduced, which is beneficial to reducing the energy consumption of the alarm module.

In this embodiment, the alarm module 230 is configured to perform at least the following operations or provide at least the following functions:

C1) Receiving the temperature data and humidity data sent regularly or irregularly from the cloud computing platform 220.

C2) Receiving the second warning message sent regularly or irregularly from the cloud computing platform 220 and present the received second warning message.

C3) Generating a corresponding third warning message based on the received temperature data and humidity data and present the generated third warning message. In this embodiment, optionally, the third warning message comprises at least the location of the elevator installation or maintenance operating area and the heat index level of the operating area. In addition, optionally, the second warning message and the third warning message may have the same or similar content.

Functions C1-C3 may be performed by a controller (e.g., a microprocessor based controller) in each alarm module 230 and executing a program to perform the operations described herein.

Optionally, the alarm module 230 is adapted to reside in the client terminal, so that the alarm module can be configured to present the second warning message or the third warning message by means of the human-computer interaction interface of the client terminal. Examples of the client terminals described here comprise, but are not limited to, mobile phones, tablet computers, notebook computers, personal digital processing, wearable watches, desktop computers, and so on.

It should be pointed out that the number of alarm modules can be one or more.

Optionally, the alarm module can be arranged in the elevator installation or maintenance operating area or in an area far away from the elevator installation or maintenance operating area, that is, the arrangement is one of the following: i) The alarm module is only arranged in the elevator installation or maintenance operating area; ii) The alarm module is only arranged in the area far away from the elevator installation or maintenance operating area; iii) The alarm module is arranged in both the elevator installation or maintenance operating area and the area far away from the elevator installation or maintenance operating area.

Figure 4:
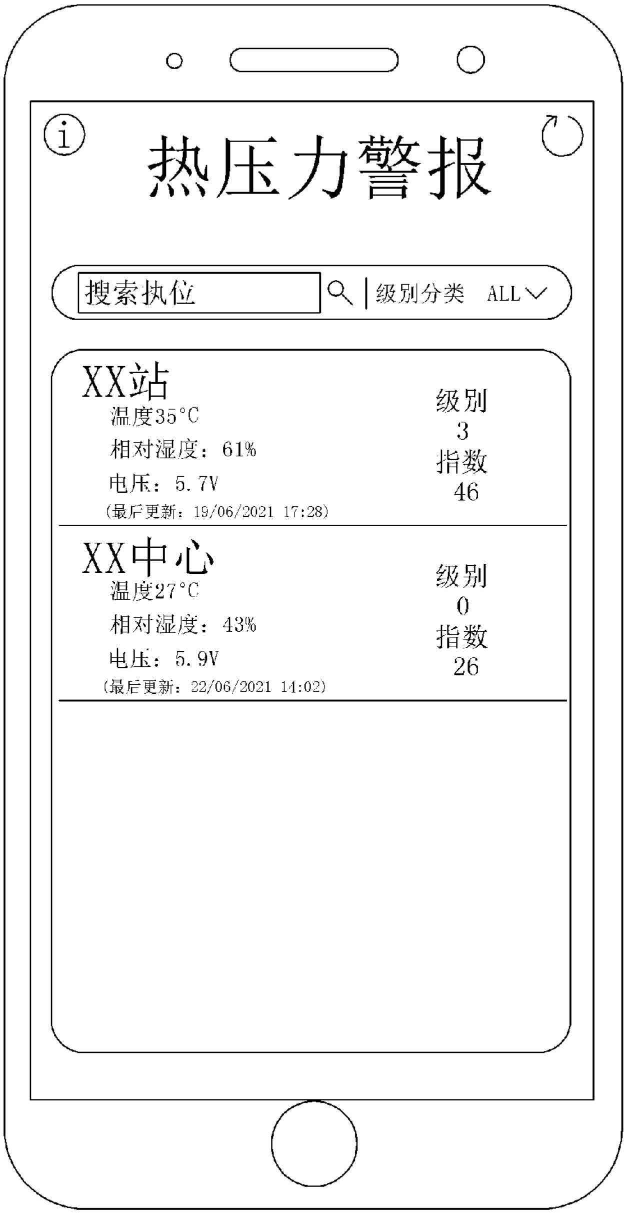
FIG. 4 is an exemplary example, which shows how the second warning message and the third warning message are presented.

FIG. 4 is an exemplary example, which shows how the second warning message and the third warning message are presented. Referring to FIG. 4, the location, temperature, relative humidity, heat index and its level of the operating area are displayed on the human-computer interaction interface (phone screen) of the client terminal as the second or third warning message.

Figure 5:
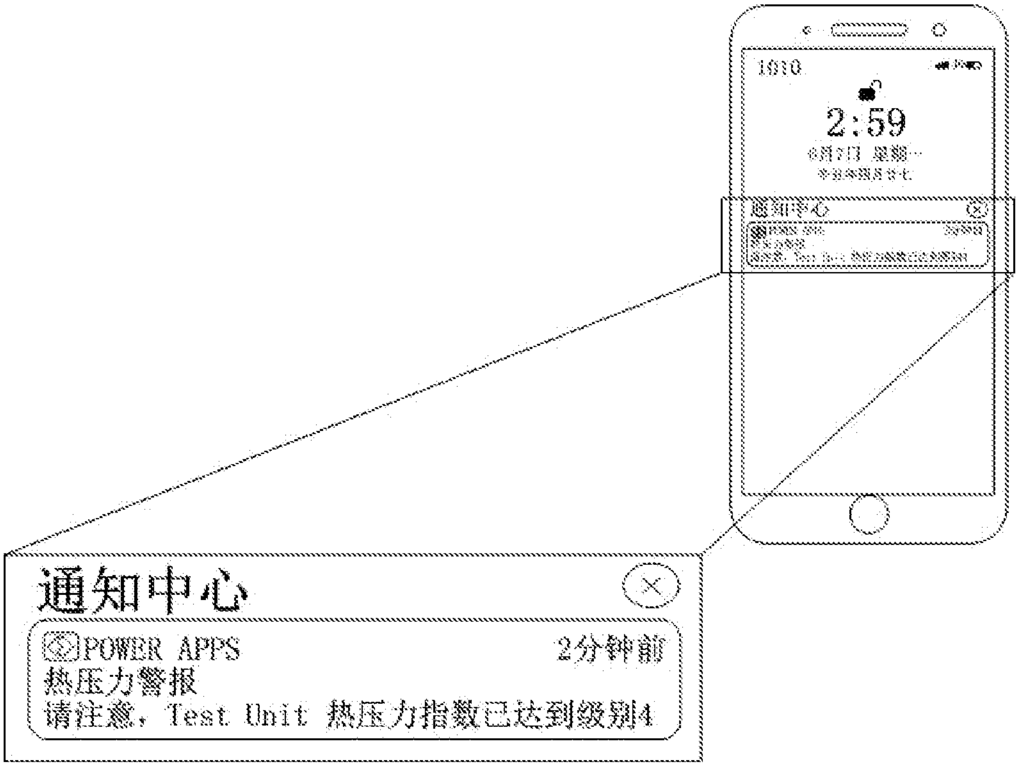
FIG. 5 is another exemplary example, which shows how the second warning message and the third warning message are presented.

FIG. 5 is another exemplary example, which shows how the second warning message and the third warning message are presented. Referring to FIG. 5, the second or third warning message is displayed on the human-computer interaction interface (phone screen) of the client terminal in text form (comprising the location of the operating area and the heat index level).

In this embodiment, each local monitoring device 210 may be associated with one or more alarm modules 230, or each alarm module 230 may also be associated with one or more local monitoring devices 210. For example, the local monitoring device 210 and the alarm module 220 located in the same operating area can be regarded as associated, because the first warning message generated at the local monitoring device 210 and the second or third warning message presented at the alarm module 220 are associated in content. For another example, in addition to being associated with the alarm module 220 located in the same operating area, the local monitoring device 210 may also be associated with the alarm module 220 far away from the operating area, because when the user of the remote alarm module 220 is, for example, an administrator responsible for safe production in the operating area, the first warning message generated at the local monitoring device 210 and the second or third warning message presented on the remote alarm module 220 are also associated in content. For another example, when a user of an alarm module 220 is responsible for supervising the safety of multiple operating areas, the alarm module 220 will be associated with multiple local monitoring devices 210, because the second or third warning message presented on the alarm module 220 and the first warning message generated at multiple local monitoring devices 210 are associated in content.

Figure 6:
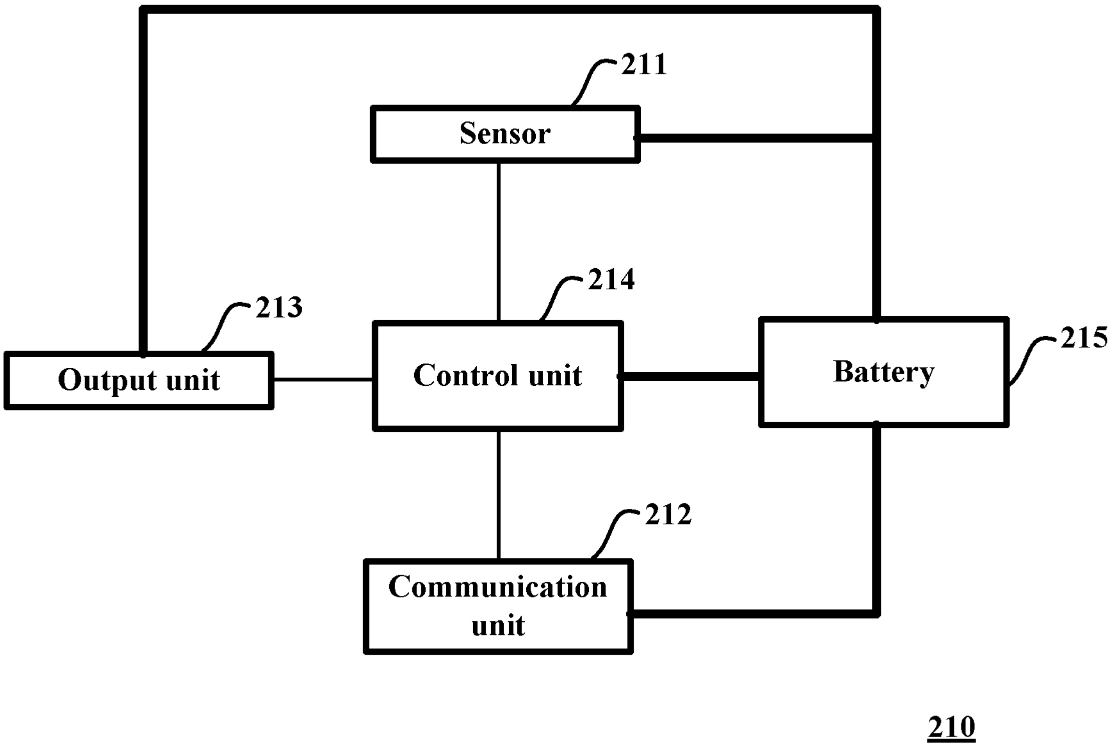
FIG. 6 is a schematic block diagram of a local monitoring device according to another embodiment of the application.

FIG. 6 is a schematic block diagram of a local monitoring device according to another embodiment of the application.

The local monitoring device 210 shown in FIG. 6 can be applied to the system shown in FIG. 2, which comprises a sensor 211, a communication unit 212, an output unit 213 and a control unit 214 (e.g., a processor). Optionally, the local monitoring device 210 further comprises a battery 215 as a power supply for the entire device.

In the local monitoring device 210 shown in FIG. 6, the sensor 211 is configured to obtain temperature data and humidity data (such as relative humidity data) of the operating area. Optionally, the sensor 211 may be a sensor component that integrates a temperature sensing function and a humidity sensing function.

The communication unit 212 may be implemented by modular components and configured to communicate with a cloud computing platform. Optionally, the communication unit 212 accesses the cloud computing platform via one of the following networks: narrowband Internet of Things, 3G/4G/5G communication network, WiFi network, Bluetooth network, and so on. As mentioned above, for elevator operating applications, it is beneficial to connect to a cloud computing platform through a narrowband Internet of Things.

The output unit 213 is configured to output a warning message locally. Optionally, the output unit 213 may comprise a plurality of LEDs whose light-emitting state is controlled by the control unit 214. Under the control of the control unit 214, one of the LEDs is lit or flashed to indicate the current heat index level of the operating area, for example, as shown in FIG. 3.

The control unit 214 may be implemented by a microcontroller, which is coupled with the sensor 211, the communication unit 212 and the output unit 213 and is configured to perform at least the following operations: Determining the heat index and its level based on the temperature data and humidity data. Optionally, it may use the relationship table shown in FIG. 1 to determine the heat index and the corresponding heat index level from the temperature data and humidity data received from the sensor 211.

Instructing the communication unit 212 to communicate with the cloud computing platform to transmit temperature data and humidity data to the cloud computing platform regularly or irregularly.

Instructing the output unit 213 to output the first warning message corresponding to the determined heat index, for example, the presentation form described above.

Figure 7:
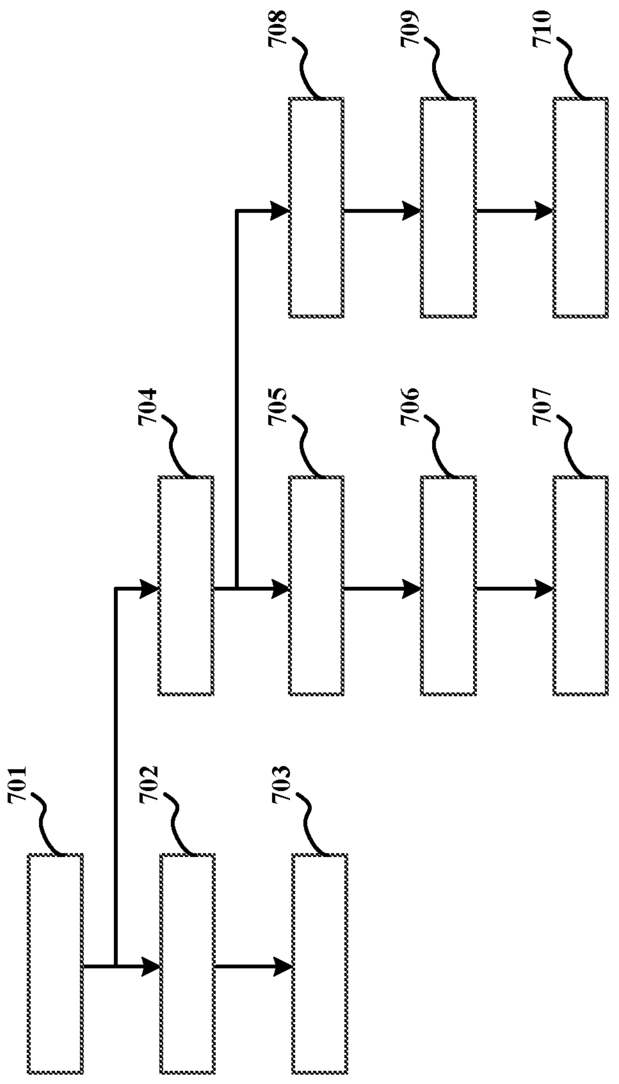
FIG. 7 is a flowchart of a method for monitoring an elevator operating environment according to another embodiment of the application.

FIG. 7 is a flowchart of a method for monitoring an elevator operating environment according to another embodiment of the application Exemplarily but not necessarily, the method shown in FIG. 7 is implemented by using the system for monitoring the elevator operating environment shown in FIG. 2. It is not difficult for those skilled in the art to understand that the method of this embodiment is not limited to be implemented in the specific example of the system for monitoring the elevator operating environment described in this specification.

As shown in FIG. 7, the method for monitoring the elevator operating environment in this embodiment comprises the following steps: Step 701: Use the local monitoring device 210 to obtain temperature data and humidity data of the elevator installation or maintenance operating area.

Step 702: Use the local monitoring device 210 to determine the heat index based on the obtained temperature data and humidity data.

Step 703: Use the local monitoring device 210 to output a first warning message corresponding to the determined heat index locally.

Optionally, the first warning message may comprise a value range or level to which the heat index of the elevator installation or maintenance operating area belongs and the longest continuous operating time interval allowed under the corresponding value range.

Optionally, the light-emitting state of the LED in the local monitoring device is used to indicate the value range or level to which the heat index of the operating area belongs.

Step 704: Use the local monitoring device 210 to transmit the temperature data and humidity data to the cloud computing platform 220 regularly or irregularly.

Step 705: Use the cloud computing platform 220 to generate a corresponding second warning message based on the temperature data and humidity data received from the local monitoring device 210.

Step 706: Send the generated second warning message to the alarm module 230.

Step 707: In response to receiving the second warning message, the alarm module 230 presents the second warning message.

Step 708: The cloud computing platform 220 sends the temperature data and humidity data obtained by the local monitoring device 210 to the alarm module 230.

Step 709: The alarm module 230 generates a corresponding third warning message based on the received temperature data and humidity data.

Step 710: The alarm module 230 presents the generated third warning message.

Optionally, the second warning message and the third warning message at least comprise: the location of the elevator installation or maintenance operating area and the value range or level to which the heat index of the operating area belongs.

Optionally, the alarm module is implemented using an application suitable for installation on the client terminal, and the application presents the second warning message or the third warning message by means of the human-computer interaction interface of the client terminal.

Optionally, the application is installed on a client terminal located in an associated elevator installation or maintenance operating area and/or a client terminal remote from the associated elevator installation or maintenance operating area.

It should be pointed out that the description order of the above steps is not equivalent to their execution order. For example, as shown in FIG. 7, steps 702 and 704 can be performed independently, so the subsequent steps of these two steps can also be performed independently; for another example, steps 705 and 708 can be performed independently, so the subsequent steps of these two steps can also be performed independently.

In the above-mentioned embodiment of the application, by simultaneously using both the local monitoring device and the alarm module to present the warning message, redundancy is provided for the safety warning mechanism, thereby improving the risk prevention capability.

According to another aspect of the application, there is provided a computer-readable storage medium on which a computer program is stored. When the program is executed by a processor, one or more steps comprised in the method described above with reference to FIG. 7 are implemented.

The computer-readable storage medium referred in the application comprises various types of computer storage media, and may be any available medium that can be accessed by a general-purpose or special-purpose computer. For example, the computer-readable storage medium may comprise RAM, ROM, EPROM, E2PROM, registers, hard disks, removable disks, CD-ROM or other optical disk storage, magnetic disk storage or other magnetic storage devices, or any other temporary or non-transitory medium that can be used to carry or store desired program code units in the form of instructions or data structures and can be accessed by general-purpose or special-purpose computers or general-purpose or special-purpose processors. Discs as used herein usually copy data magnetically, while dishes use lasers to optically copy data. Combination of the above should also be comprised in the protection scope of the computer-readable storage medium. An exemplary storage medium is coupled to the processor such that the processor can read and write information from/to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

Those skilled in the art will understand that the various illustrative logic blocks, modules, circuits, and algorithm steps described herein can be implemented as electronic hardware, computer software, or a combination of both.

In order to show the interchangeability between hardware and software, various illustrative components, blocks, modules, circuits, and steps are generally described above based on their functionality. The implementation of such functionality in the form of hardware or software depends on the specific application and the design constraints imposed on the overall system. Those skilled in the art can implement the described functionality in a varying manner for specific applications, but such implementation decisions should not be understood as causing deviations from the scope of the application.

Although only some of the specific implementations of the application are described, those of ordinary skill in the art should understand that the application can be implemented in many other forms without departing from the spirit and scope of the application. Therefore, the examples and implementations shown are regarded as illustrative rather than restrictive, and the application may cover various modifications and replacement without departing from the spirit and scope of the application as defined by the appended claims.

The embodiments and examples proposed herein are provided in order to best illustrate the embodiments according to the present technology and its specific applications, and thereby enable those skilled in the art to implement and use the application. However, those skilled in the art will know that the above description and examples are provided only for ease of description and examples. The presented description is not intended to cover every aspect of the application or to limit the application to the precise form disclosed.

What is claimed is:

1. A system for monitoring an elevator operating environment, comprising at least one local monitoring device, a cloud computing platform, and at least one alarm module associated with the local monitoring device, wherein, each of the local monitoring devices is arranged in an associated elevator installation or maintenance operating area and is configured to:

determine heat index based on temperature data and humidity data of the associated elevator installation or maintenance operating area, and output a first warning message corresponding to the determined heat index locally; and transmit the temperature data and humidity data to the cloud computing platform regularly or irregularly, wherein, the cloud computing platform is configured to send the temperature data and humidity data to the alarm module regularly or irregularly, and the alarm module is configured to generate a corresponding third warning message based on the temperature data and humidity data and present the generated third warning message; or the cloud computing platform is configured to generate a corresponding second warning message based on the temperature data and humidity data and send the second warning message to the alarm module, and the alarm module is configured to present the second warning message sent from the cloud computing platform.

2. The system of claim 1, wherein each of the local monitoring devices comprises:

a sensor configured to obtain the temperature data and humidity data of the associated elevator installation or maintenance operating area;

a communication unit configured to communicate with the cloud computing platform;

an output unit; and a control unit coupled with the sensor, the communication unit and the output unit, the control unit is configured to perform the following operations:

determine the heat index based on the temperature data and humidity data;

instruct the output unit to output a first warning message corresponding to the determined heat index; and instruct the communication unit to transmit the temperature data and humidity data to the cloud computing platform.

3. The system of claim 2, wherein the local monitoring device further comprises a battery as a power supply source.

4. The system of claim 2, wherein the communication unit communicates with the cloud computing platform via at least one of the following networks: narrowband Internet of Things, 3G/4G/5G communication network, WiFi network, and Bluetooth network.

5. The system of claim 2, wherein the first warning message comprises a value range or level to which the heat index of the associated elevator installation or maintenance operating area belongs and a longest continuous operating time interval allowed under the corresponding value range.

6. The system of claim 5, wherein the output unit comprises a plurality of light-emitting diodes whose light-emitting state is controlled by the control unit, and the light-emitting state of each light-emitting diode is used to indicate the value range or level to which the heat index of the associated elevator installation or maintenance operating area belongs.

7. The system of claim 6, wherein the control unit controls the light-emitting diode to periodically emit light to indicate the value range or level to which the heat index of the associated elevator installation or maintenance operating area belongs.

8. The system of claim 6, wherein the longest continuous operating time interval is printed in an area close to the light-emitting diode.

9. The system of claim 1, wherein the second warning message and the third warning message comprise at least: the location of the associated elevator installation or maintenance operating area and the value range or level to which the heat index of the operating area belongs.

10. The system of claim 1, wherein the alarm module is adapted to reside in a client terminal, and is configured to present the second warning message or the third warning message by means of a human-computer interaction interface of the client terminal.

11. The system of claim 1, wherein the alarm module is arranged in the associated elevator installation or maintenance operating area or in an area away from the associated elevator installation or maintenance operating area.

12. A method for monitoring an elevator operating environment, comprising the following steps:

A. using a local monitoring device to determine heat index based on temperature data and humidity data of an associated elevator installation or maintenance operating area, and output a first warning message corresponding to the determined heat index locally, the method also comprises the following steps performed independently of step A:

B1. using the local monitoring devices to transmit the temperature data and humidity data to a cloud computing platform regularly or irregularly;

B2. using the cloud computing platform to generate a corresponding second warning message based on the temperature data and humidity data and send the second warning message to an alarm module so that the alarm module presents the second warning message sent by the cloud computing platform, or send the temperature data and humidity data from the cloud computing platform to the alarm module so that the alarm module generates a corresponding third warning message based on the temperature data and humidity data and presents the generated third warning message.

13. The method of claim 12, wherein the first warning message comprises a value range or level to which the heat index of the associated elevator installation or maintenance operating area belongs and a longest continuous operating time interval allowed under the corresponding value range.

14. The method of claim 13, wherein the light-emitting state of the light-emitting diode in the local monitoring device is used to indicate the value range or level to which the heat index of the associated elevator installation or maintenance operating area belongs.

15. The method of claim 12, wherein the second warning message and the third warning message comprise at least: the location of the associated elevator installation or maintenance operating area and the value range or level to which the heat index of the operating area belongs.

16. The method of claim 12, wherein the alarm module is implemented by using an application suitable to be installed on the client terminal, and the alarm module presents the second warning message or the third warning message by means of a human-computer interaction interface of the client terminal.

17. The method of claim 16, wherein the alarm module is arranged in the associated elevator installation or maintenance operating area or in an area away from the associated elevator installation or maintenance operating area.

18. A computer-readable storage medium having instructions stored in the computer-readable storage medium, wherein, when the instructions are executed by a processor, the processor is caused to execute the method according to claim 12.

* * * * *